(12) United States Patent
Giudiceandrea et al.

(10) Patent No.: US 12,061,153 B2
(45) Date of Patent: Aug. 13, 2024

(54) METHOD AND APPARATUS FOR CAPTURING AN IMAGE OF A LATERAL FACE OF A WOODEN BOARD

(71) Applicant: MICROTEC S.R.L., Bressanone (IT)

(72) Inventors: Federico Giudiceandrea, Bressanone (IT); Mauro Cossi, Martellago (IT); Marco Boschetti, Levico Terme (IT)

(73) Assignee: MICROTEC S.R.L., Bressanone (IT)

( * ) Notice: Subject to any disclaimer, the term of this patent is extended or adjusted under 35 U.S.C. 154(b) by 221 days.

(21) Appl. No.: 17/327,180

(22) Filed: May 21, 2021

(65) Prior Publication Data

US 2021/0374450 A1 Dec. 2, 2021

(30) Foreign Application Priority Data

May 29, 2020 (IT) .......... 102020000012946

(51) Int. Cl.
*G01N 21/898* (2006.01)
*G06T 5/00* (2024.01)
*G06T 5/50* (2006.01)

(52) U.S. Cl.
CPC .......... *G01N 21/8986* (2013.01); *G06T 5/00* (2013.01); *G06T 5/50* (2013.01); *G06T 2207/10024* (2013.01)

(58) Field of Classification Search
CPC ....... G01B 11/04; G01B 11/245; G01B 11/03; G01N 21/8986; G01N 33/46; G01N 21/89; G01N 21/8901; H04N 17/002; H04N 7/18; B65G 17/00; B65G 17/38
See application file for complete search history.

(56) References Cited

U.S. PATENT DOCUMENTS

| 4,301,373 | A | | 11/1981 | Sjodin |
| 5,274,244 | A | * | 12/1993 | Johansson .............. G01N 33/46 250/559.4 |
| 6,466,305 | B1 | | 10/2002 | McBain |

(Continued)

FOREIGN PATENT DOCUMENTS

| AT | 507081 A4 | 2/2010 |
| CA | 2309008 A1 | 11/2000 |

(Continued)

*Primary Examiner* — Gandhi Thirugnanam
(74) *Attorney, Agent, or Firm* — Pearne & Gordon LLP; J. Gregory Chrisman

(57) ABSTRACT

Method and apparatus for capturing an image of a lateral face of a wooden board, where the lateral face (2) is parallel to a main axis of development of the wooden board (3), with the method comprising a step for feeding the wooden board (3) with the lateral face (2) transverse to a feeding direction (4), a step for illuminating the lateral face (2), a step for capturing, using a plurality of area scan cameras (9), a plurality of first digital images at different times, where each first digital image comprises a portion (10) of the lateral face (2) extending for an entire height of the lateral face (2) transverse to the main axis of development and for part of a length of the lateral face (2) along the main axis of development, where the set of all such portions (10) corresponds to the entire lateral face (2), and a merging step for merging the first digital images using an electronic processing unit to obtain a second digital image showing the entire lateral face (2).

15 Claims, 8 Drawing Sheets

(56) References Cited

U.S. PATENT DOCUMENTS

| | | | | |
|---|---|---|---|---|
| 6,484,066 | B1* | 11/2002 | Riess | G01B 11/00 |
| | | | | 700/218 |
| 8,885,936 | B2* | 11/2014 | Webb | G09G 5/02 |
| | | | | 382/167 |
| 10,247,678 | B1* | 4/2019 | Detinkin | G01N 21/95 |
| 10,580,126 | B1* | 3/2020 | Weinschenk | G06F 30/13 |
| 10,748,270 | B2 | 8/2020 | Eisner et al. | |
| 2002/0085093 | A1 | 7/2002 | Frigon et al. | |
| 2004/0246473 | A1* | 12/2004 | Hermary | G01N 33/46 |
| | | | | 356/237.1 |
| 2012/0218437 | A1* | 8/2012 | Hermary | G06T 5/90 |
| | | | | 348/222.1 |
| 2014/0002634 | A1 | 1/2014 | Karinen | |
| 2016/0274022 | A1* | 9/2016 | Gagné | G01N 33/46 |
| 2017/0270657 | A1 | 9/2017 | Eisner et al. | |
| 2021/0327049 | A1* | 10/2021 | Bolton | B27K 5/02 |
| 2021/0374450 | A1* | 12/2021 | Giudiceandrea | G06T 5/00 |
| 2022/0051392 | A1* | 2/2022 | Morita | G01N 21/8806 |

FOREIGN PATENT DOCUMENTS

| | | | | |
|---|---|---|---|---|
| CA | 2563018 | | 4/2008 | |
| EP | 1950561 | | 7/2008 | |
| EP | 2679951 | A2 | 1/2014 | |
| EP | 3220143 | | 1/2019 | |
| JP | 4421437 | B2* | 2/2010 | H04N 1/6086 |

* cited by examiner

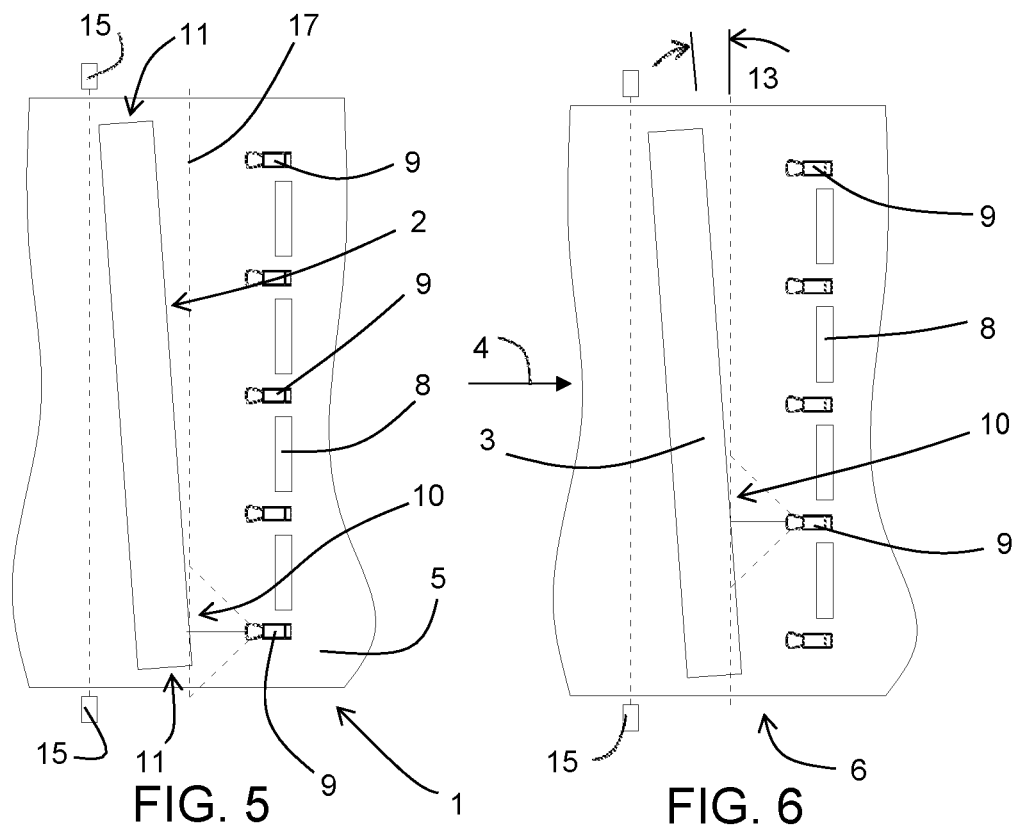
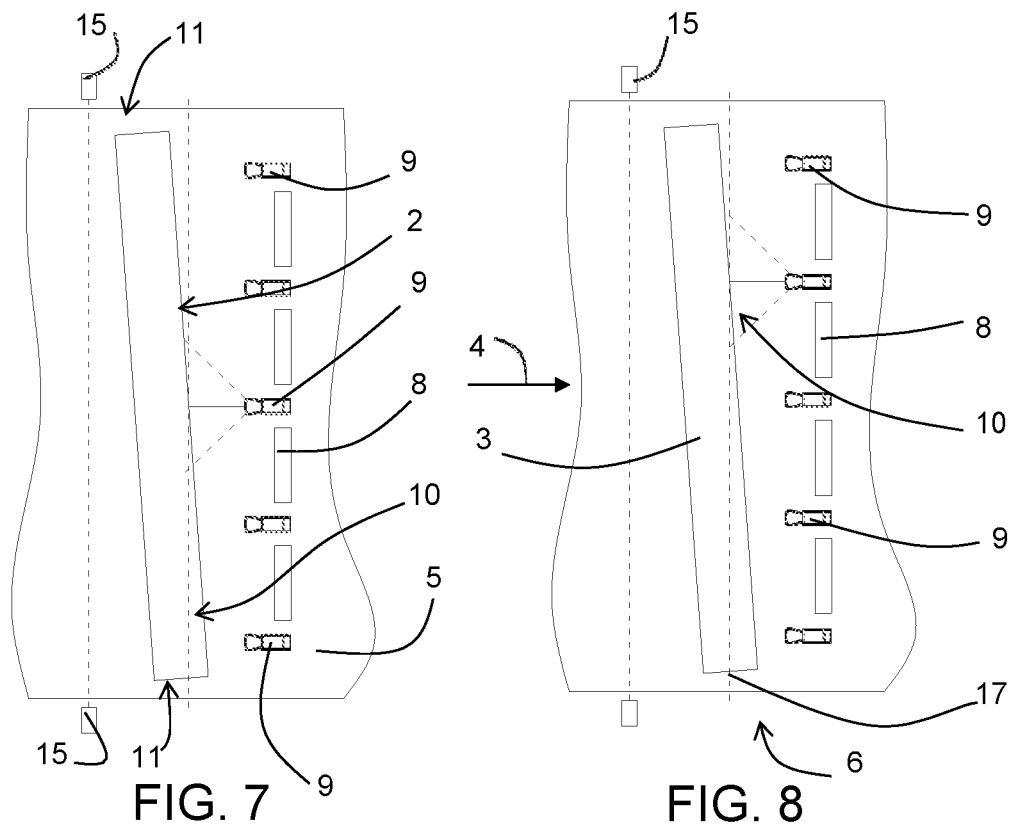

METHOD AND APPARATUS FOR CAPTURING AN IMAGE OF A LATERAL FACE OF A WOODEN BOARD

The present invention relates to a method and an apparatus for capturing an image of a lateral face of a wooden board.

In the context of the present invention and of the description that follows, all reference to an image means an image captured on the visible or infrared light spectrum, therefore representing the appearance of a lateral face on such spectrum band/wavelengths and in the foreseen illumination conditions.

A wooden board is, on first approximation, a parallelepiped that is elongated along a main axis of development and has three pairs of faces, each approximately equal to its opposite and located on opposite sides of the board: a first pair of main faces being parallel to the main axis of development; a second pair of main faces also being parallel to the main axis of development but substantially perpendicular to the main faces in the first pair; and a pair of end faces being perpendicular to the main axis of development. Each main face therefore has an equal length to the length of the entire board.

The present invention arises with reference to timber processing plants, where wooden boards commonly undergo numerous checks and tests. One of the operations commonly performed on wooden boards is that digital images are captured of each of their faces, or at least of each main face.

According to some of the solutions used currently, the capturing of digital images is carried out while the boards are fed along a conveyor, arranged with their main axis of development approximately perpendicular to the feeding direction. The wooden boards move forwards with one of their main faces resting on a feeding plane, until they reach an observation zone. One pair of main faces therefore lies substantially parallel to the feeding direction, while the other pair of main faces is transverse to the feeding direction. In continuing the present description, and in referring to the movement of boards on this type of transverse conveyors, the main faces arranged parallel to the feeding plane will be defined as "front faces", while "lateral faces" will mean the main faces arranged transverse to the feeding direction.

At the observation zone, the images of the faces of the wooden boards are captured using two linear sensors, placed one above the board and one underneath the board, at an opening present in the conveyor. In the context of the present description, the definitions "linear sensor" and "linear camera" will be used indistinctly to indicate a sensor comprising a single row of independent detection cells.

Each linear sensor extends over the entire width of the conveyor, and is configured and arranged in such a way as to form a reading plane inclined relative to the feeding plane (generally at an angle of between 30° and 45° and parallel to a line perpendicular to the feeding direction). In particular, one sensor is inclined in such a way as to be able to observe a lateral face (for example, the forward-facing one relative to the feeding direction) and a front face (for example, the bottom one), the other sensor is inclined in such a way as to be able to observe the other lateral face (for example, the backward-facing one relative to the feeding direction) and the other front face (for example, the top one). However, it can be understood that the same result can also be obtained by using a greater number of linear sensors, such as one per relevant face.

Each sensor is controlled and activated in such a way as to capture a plurality of linear images one after another, while the wooden board moves along the feeding direction with a frequency that is sufficient to ensure that the entire surface of the relevant faces of the wooden board is captured at least once.

One electronic processing unit is programmed to merge the individual linear images and obtain full images of the various faces.

As can be deduced, since each linear image is obtained at the intersection between the reading plane and the relevant face of the wooden board, the situation is different when capturing images of the front faces or images of the lateral faces, as illustrated in FIGS. 11 to 14, which show, in succession, four successive moments of a linear image being captured according to the prior-art technique.

The front faces are parallel to the feeding direction and, as a consequence, the position of the intersection between the reading plane and the front face is fixed and does not depend on the position of the front face along the feeding direction. All linear images can therefore be captured under identical operating conditions in terms of the distance between the sensor and the surface being captured as a linear image, and in terms of the illumination conditions of this surface (FIG. 14).

On the other hand, the lateral faces are perpendicular to the feeding direction. This means that the position of the intersection between the reading plane and the lateral face depends on the position of the lateral face along the feeding direction (FIGS. 11-13).

By way of example, FIGS. 11 to 13 illustrate the case of a sensor that is positioned above the board and configured to capture linear images of the forward-facing lateral face relative to the feeding direction; as shown, the lateral face gradually approaches the sensor as the board moves along the feeding direction. The first part of the lateral face being captured as a linear image is therefore the edge that is resting on the feeding plane (FIG. 12), while the last part being captured as a linear image is the edge farthest from the feeding plane (FIG. 14).

The main problem of this manufacturing solution is the difficulty in ensuring identical illumination for each capture.

Using a linear camera to capture the images enables the use of a light source that is practically in line with the position of the cameras themselves, in such a way as to create a light plane that coincides with the plane framed by the cameras themselves. This approach allows light to be concentrated in a restricted area and therefore allows an optimisation of the power emitted. Moreover, variations in lighting are basically dependent on the variation in distance between the surface and the lamp.

Nevertheless, a coaxial lamp creates suboptimal lighting for measuring the colouring of the surface, because it exaggerates any roughness or imperfections on the surface and is also heavily influenced by any variations in the inclination of the board's surface.

To try to overcome this drawback, one prior-art technique is to add lamps that illuminate from different directions. Although this allows a more reliable assessment of the colouring of the surface, it nevertheless creates additional problems in obtaining the correct lighting. In particular, the lamps must necessarily illuminate a much wider area, as it is no longer possible to fit the light within the plane framed by the camera. The lighting system is much less efficient and it is highly complex to design it in such a way for the lighting to be consistent across a much wider area (across all of the space that the face of the board will occupy from the beginning to the end of the capture).

This means that all of these prior-art solutions have considerable drawbacks when reconstructing the overall image of each lateral face, which can lead to considerable errors.

Since having images that faithfully reproduce the appearance of each face is fundamental for timber quality assessment procedures, the shortcomings of the capturing methods currently being used also negatively impact on the quality assessment of wooden boards.

In this context, the technical purpose of the present invention is to implement a method and an apparatus for capturing an image of a lateral face of a wooden board which offer a solution to the issues mentioned above.

In particular, the technical purpose of the present invention is to implement a method and an apparatus for capturing an image of a lateral face of a wooden board, which ensure that images are captured more precisely and accurately than in prior-art apparatuses.

The technical purpose and the aims indicated above are substantially achieved by a method and an apparatus for capturing an image of a lateral face of a wooden board in accordance with the contents of the claims enclosed.

Further features and the advantages of the present invention will become more apparent after a careful reading of the detailed description of several preferred, non-limiting embodiments of a method and an apparatus for capturing an image of a lateral face of a wooden board, as shown in the accompanying drawings, in which:

FIG. 5 shows a third embodiment of the apparatus in accordance with the present invention, in a first moment;

FIGS. 6 to 9 show the apparatus in FIG. 5 in four successive moments;

Figure 1:
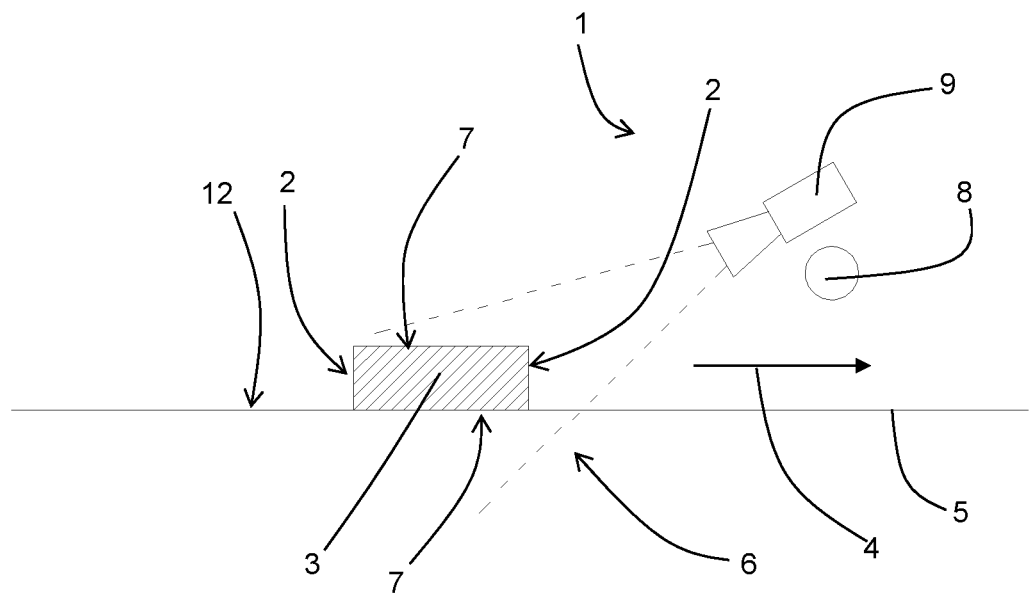
FIG. 1 shows a schematic lateral view of an apparatus made according to the present invention.

First, the various implementations of the method according to the invention and, subsequently, the various embodiments of the apparatus 1 according to the present invention, will be described below. However, it should be kept in mind that the various implementations of the method are operated in at least one of the embodiments of the apparatus 1 and that, vice versa, each embodiment of the apparatus 1 operates at least some implementations of the method. Moreover, the descriptions below, when relating to the method, should be understood as also being applicable to one or more embodiments of the apparatus 1, if technically possible, and vice versa.

As mentioned above, the method according to the invention is a method for capturing an image of a lateral face 2 of a wooden board 3, where the lateral face 2 is a face parallel to the main axis of development of the wooden board 3, arranged transverse to the feeding direction of the wooden board 3.

Depending on requirements, the method may be operated to capture an image showing the forward-facing lateral face 2 of the wooden board 3 relative to the feeding direction 4, or the backward-facing lateral face 2 of the wooden board 3 relative to the feeding direction 4. Advantageously, however, the method is operated to capture an image showing each of such lateral faces 2. Generally, all reference made to the lateral face 2 below shall mean either of the two.

First of all, the method comprises a feeding step in which, using a conveyor 5, the wooden board 3 is fed along a feeding direction 4 until it reaches an observation zone 6. The feeding step is operated by keeping the lateral face 2 arranged transverse to the feeding direction 4. Depending on the implementations, and/or the operating positions, the feeding step can be performed by keeping the lateral face 2, on average, either perpendicular to the feeding direction 4 or inclined relative to the feeding direction 4, albeit at an angle not exceeding a pre-determined angle limit (advantageously equal to 5°), with it being understood that the lateral face 2 nevertheless remains approximately perpendicular to the feeding plane 12 on which the bottom front face 7 of the wooden board 3 lies.

While the wooden board 3 is in the observation zone 6, the method provides for an illumination step or a capturing step being performed.

In the illumination step, the lateral face 2 is illuminated with at least one light source 8, and preferably with a plurality of light sources 8. The one or more light sources 8 are advantageously fixed and are positioned outside of a feeding path of the wooden board 3 defined by the conveyor 5. Moreover, advantageously, the one or more light sources 8 emit light in the relevant spectrum (therefore, generally visible and/or infrared). Preferably, the light sources 8 are arranged collectively and configured in such a way as to ensure the most uniform illumination possible of the entire lateral face 2. In particular, the light sources 8 may be arranged with some above and some below the plane defined by the conveyor.

In some applications, such as those in which the surface appearance of the lateral face 2 is to be detected, the illumination step may be performed with uniform light; in other words, in such a way as to illuminate each point of the surface in a similar way.

In some applications, however, such as those in which the images captured are used to assess the scattering of light inside the wood, the illumination step may be performed with structured light; for example, a sequence or an array of spots (points) of laser light.

In the capturing step, which is performed while the lateral face 2 is illuminated by the one or more light sources 8, a plurality of first digital images are captured using a plurality of area scan cameras 9 that are also located outside of the feeding path. Each first digital image is captured in such a way as to show a portion 10 of the lateral face 2 that extends only for part of the main axis of development. Therefore, each portion 10 visible in one of the first digital images has a height (measured transversely to the main axis of development) equal to the height of the lateral face 2, and a length (measured along the main axis of development) equal to a part of the length of the entire lateral face 2. Moreover, the first digital images are captured in such a way that the set of all relative portions 10 of the lateral face 2 corresponds to the entire lateral face 2; advantageously, also for the purposes of performing the subsequent merging step, each portion 10 visible in a first digital image is partly superimposed over the portions 10 axially adjacent thereto. Therefore, below, portion 10 of the lateral face 2 will mean the part of the surface which is shown in each first digital image.

Once the capturing step is complete, the method provides for a merging step in which, using an electronic processing unit (not shown), the first digital images are merged to obtain a second digital image showing the entire lateral face 2. For this purpose, any known means of image processing may be used;

therefore, this aspect will not be described in detail. Preferably, the second digital image is processed as if it were an image captured by observing each point of the surface of the lateral face 2 perpendicularly (thus correcting the perspective effects) and, therefore, its proportions correspond to those of the lateral face 2 itself (it does not include backgrounds).

In many industrial applications of the timber processing sector, conveyors are already installed and can be used according to the method described in the present invention (i.e. "transverse" conveyor).

Figure 15:
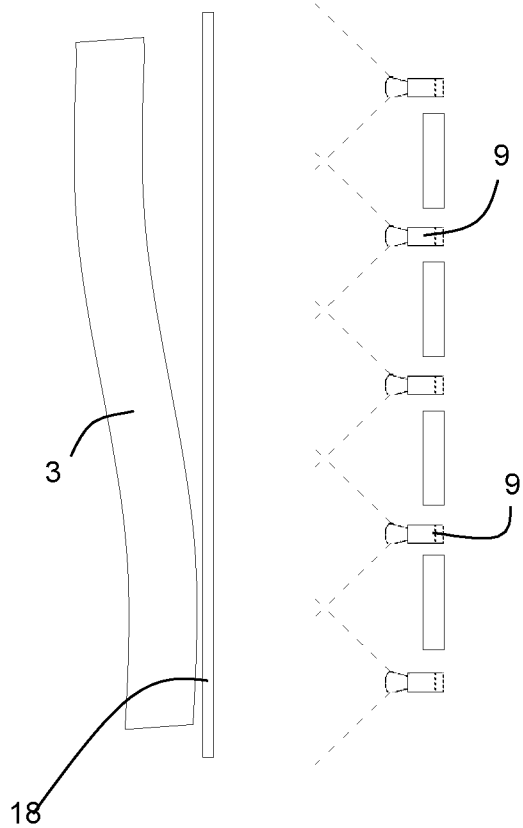
FIG. 15 shows a fourth embodiment of the apparatus in accordance with the present invention.
Figure 16:
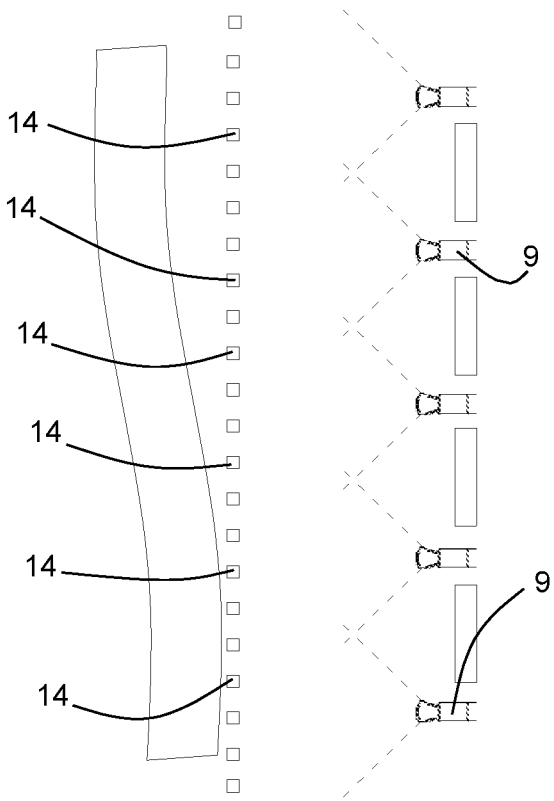
FIG. 16 shows a fifth embodiment of the apparatus in accordance with the present invention.
Figure 17:
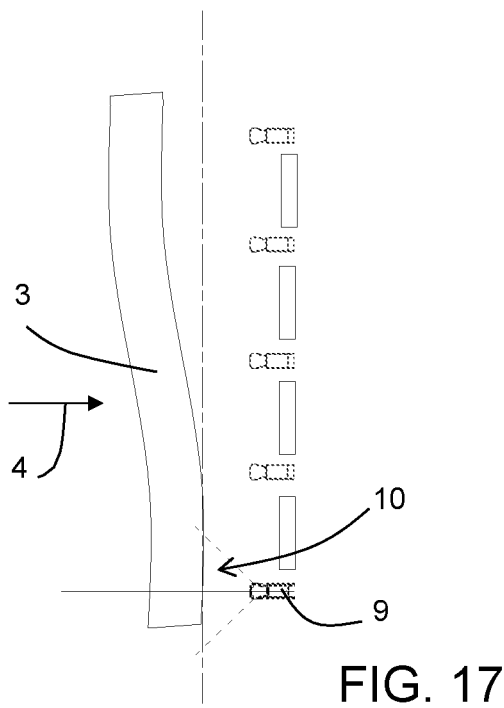
FIGS. 17 to 21 show the apparatus in FIG. 5 in four successive moments.
Figure 18:
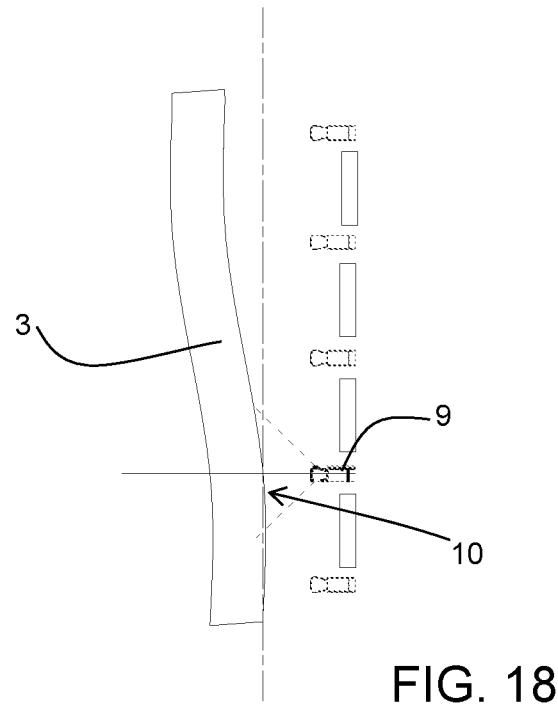
Figures 19, 20, 21:
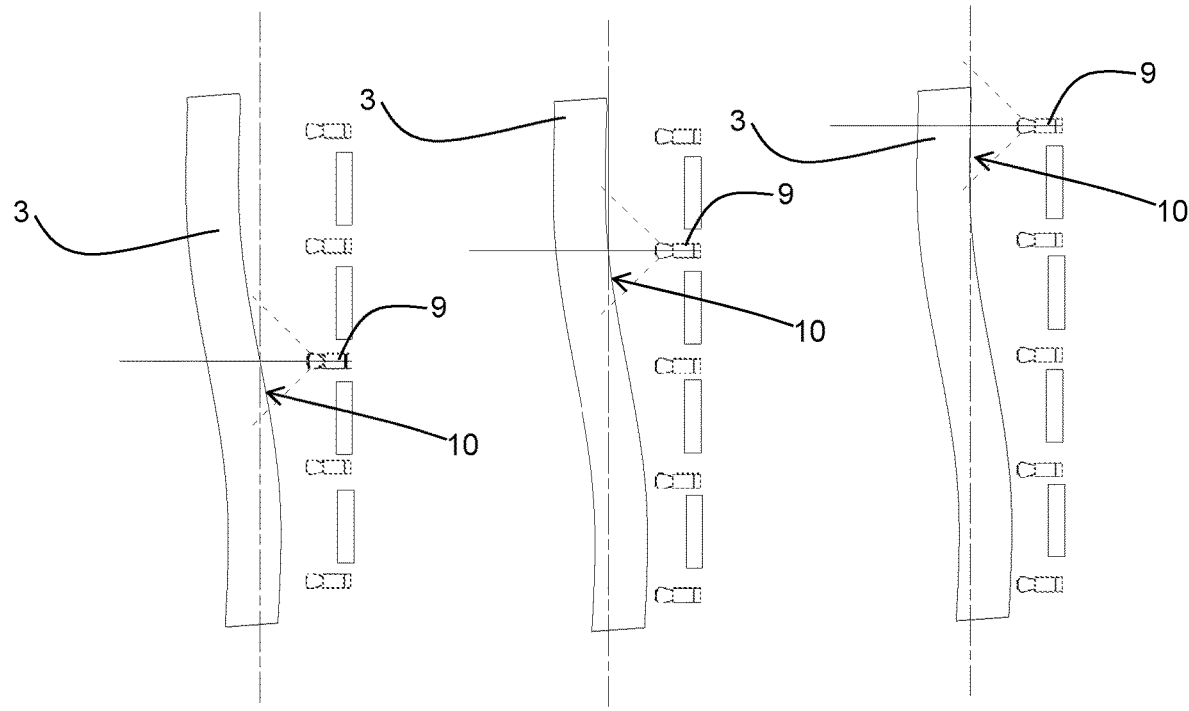

These conveyors are configured to feed the wooden board 3, keeping it transverse to the feeding direction 4 but, in general, not precisely perpendicular thereto. Therefore, in these conveyors, the boards advance quite freely and so it can happen that one of the two ends 11 crosses the observation zone 6 before the other (FIGS. 3 and 4), and that the lateral face 2 is inclined relative to the plane 17 perpendicular to the feeding direction 4. The same situation can also occur when the wooden boards 3 are not perfectly straight and the lateral face 2 is curved (FIGS. 15-16).

To address these various situations that can occur with transverse conveyors, the method may foresee an identification step, performed using an electronic device.

In the identification step, at least the position of each portion 10 along the feeding direction 4 is identified. The position of the portion 10 means the position along the feeding direction 4 of at least one of its points whose position in the portion 10 itself is known (for example, a barycentric point or a point located along the main axis of development).

Figure 4:
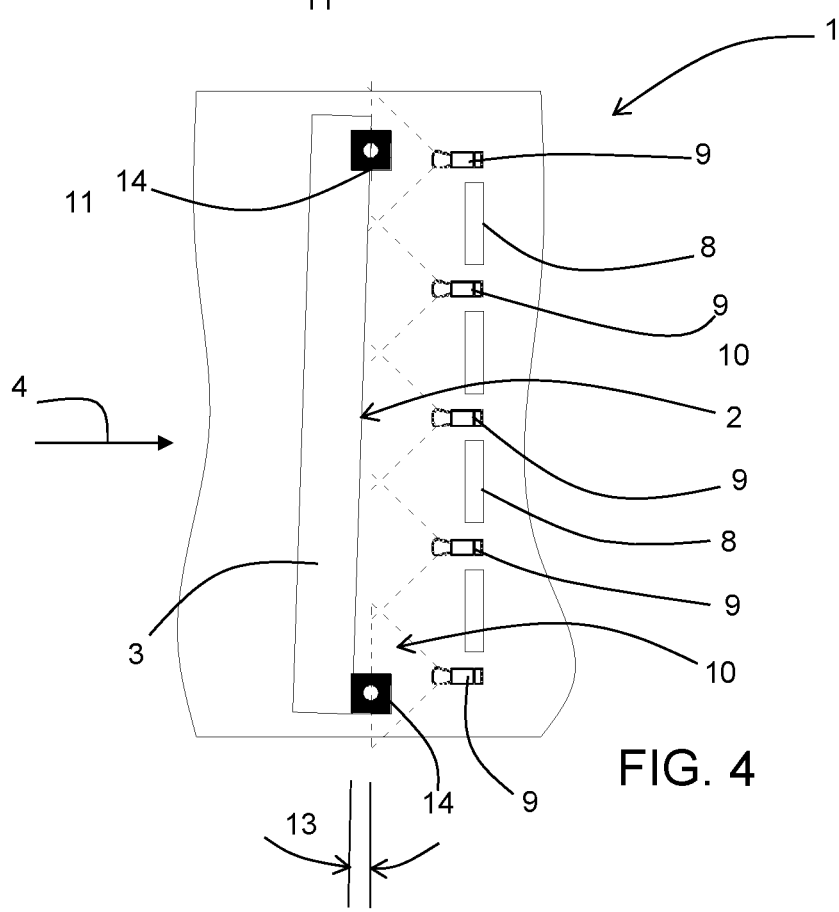
FIG. 4 shows the apparatus in FIG. 3, in a second operating position.
Figure 9:
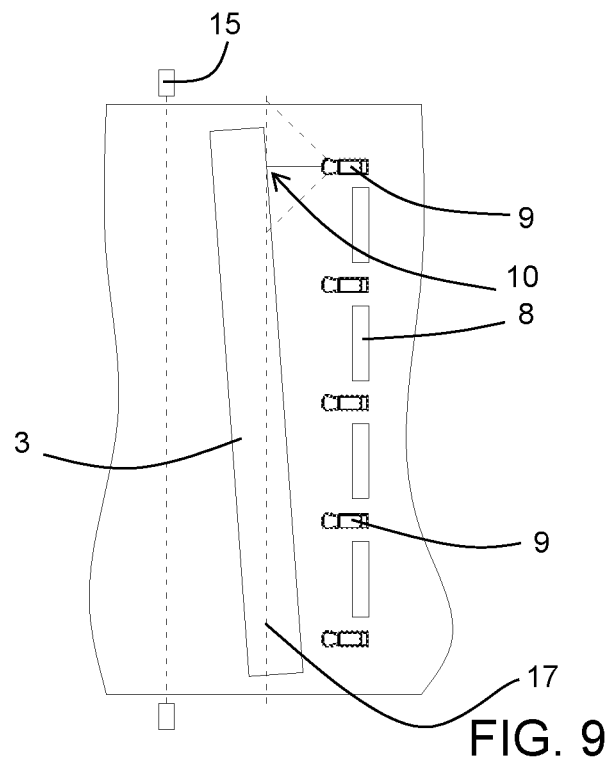
Figure 22:
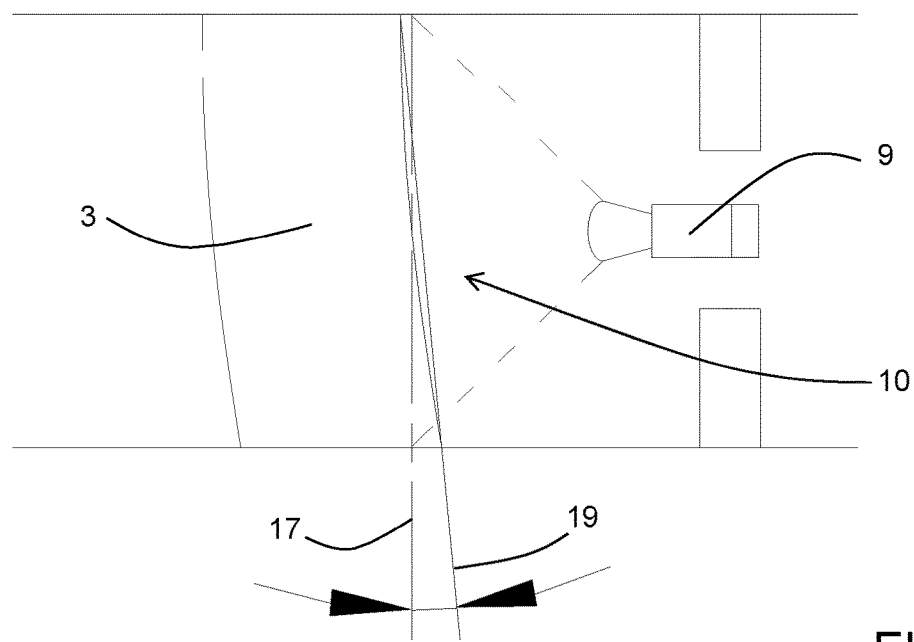
FIGS. 22 to 24 show three different implementations of the method according to the present invention in relation to the performance of the step shown in FIG. 20.
Figure 23:
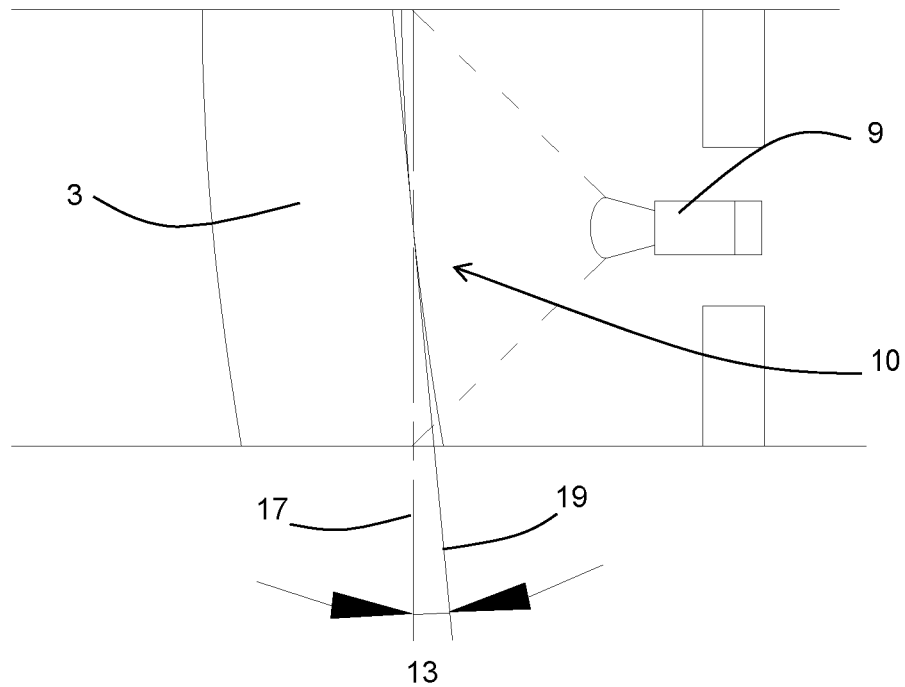
Figure 24:
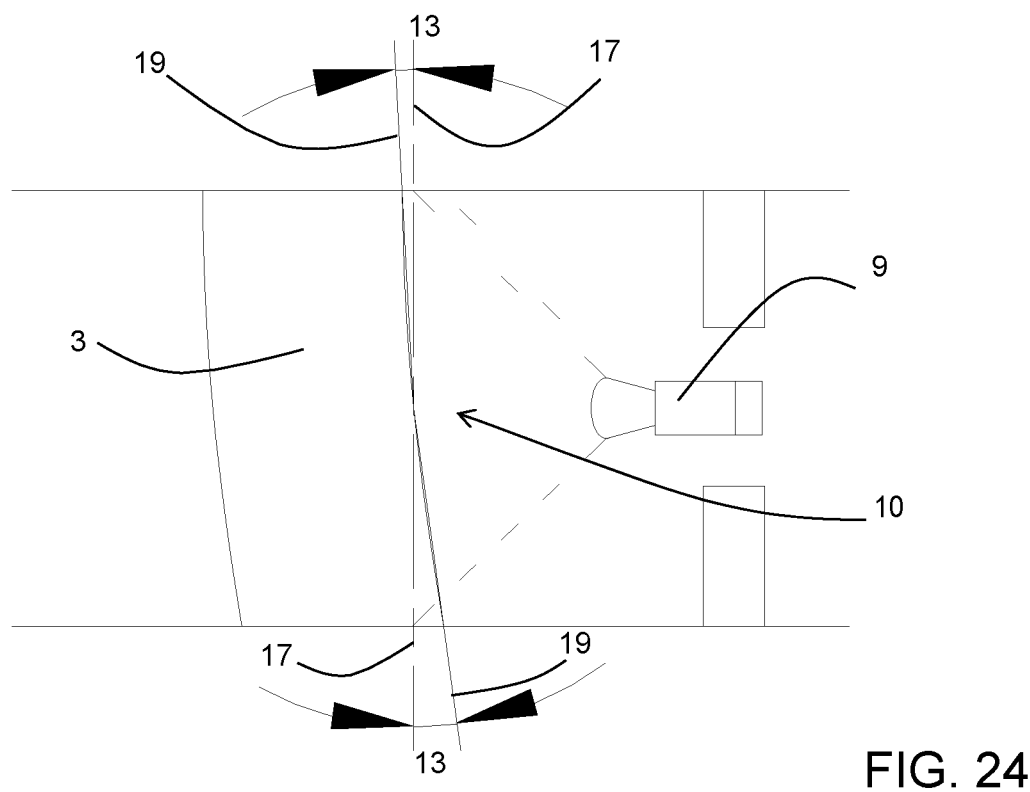

Preferably, however, in the identification step, one or more inclinations of each portion 10 are also identified relative to the plane 17 perpendicular to the feeding direction 4. The one or more inclinations are assessed as a rotation about an axis perpendicular to the feeding plane. If more than one inclination is identified for the same portion 10, then each of these inclinations refers to a distinct band of the portion 10, with each band extending perpendicularly to the feeding plane 12. The purpose of this approach is to approximate, using a multifaceted surface (in which each facet corresponds to one of the bands), concave or convex stretches of each portion 10. Consequently, if the portion 10 is flat, there will be only one inclination measured; indeed, if the entire lateral face 2 is flat, it will suffice to identify a single inclination for the entire face (FIG. 4). On the other hand, if the lateral face is not flat but features largely unaccentuated concavities and/or convexities, it may suffice to identify a single inclination for each portion 10 and to approximate the surface of each portion with a single flat surface (FIGS. 22-23). On the other hand, if the concavity and/or the convexity of a portion 10 exceeds the chosen tolerance threshold, the portion 10 can be divided into a plurality of bands and each band can be approximated with a flat face; the portion as a whole is then approximated by a multifaceted surface perpendicular to the feeding plane 12. An example of this type is shown in FIG. 24 with reference to the same portion as in FIGS. 22-23; in FIG. 24, the surface of the portion 10 is approximated by two flat faces with different inclinations.

Figure 2:
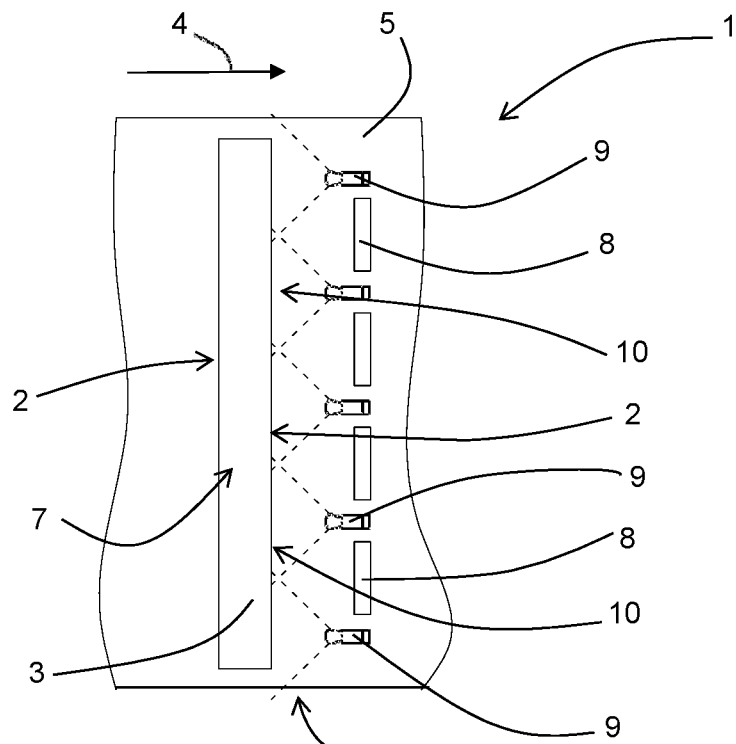
FIG. 2 shows a view from above of the apparatus shown in FIG. 1.

In the preferred embodiments, each inclination is identified by assessing an angle of inclination 13, which can be determined in different ways depending on the chosen embodiments. In general, the angle of inclination 13 is the angle formed about an axis of rotation that is perpendicular to the feeding plane 12 (perpendicular to the plane shown in the drawing in accompanying FIGS. 2 to 10 and 15 to 24) from a flat surface 19 approximating the surface of the portion 10, or a part thereof, relative to the plane 17 perpendicular to the feeding direction 4. When the flat surface 19 is perpendicular to the feeding direction 4 (as in FIG. 2), the angle of inclination 13 is assumed to be equal to 0°.

In particular, if the portion 10 (or part thereof) is flat, the angle of inclination 13 is that which is formed between the portion 10 and the plane perpendicular to the feeding direction 4 (measured about the axis perpendicular to the feeding plane 12). If, instead, the portion 10 (or part thereof) is concave or convex, the angle of inclination can be chosen as equal to that formed by a plane 19 approximating the portion 10 (or part thereof), such as the tangential plane at one of its points (for example, its barycentric point—FIG. 23), or the plane that passes along its edges (those perpendicular to the wooden board's main axis of development—FIGS. 22 and 24) or any other plane.

Once the one or more inclinations of the portion 10 and its position along the feeding direction 4 are known, the position of all other points of the portion 10 can be easily calculated from the position of the known points.

Figure 3:
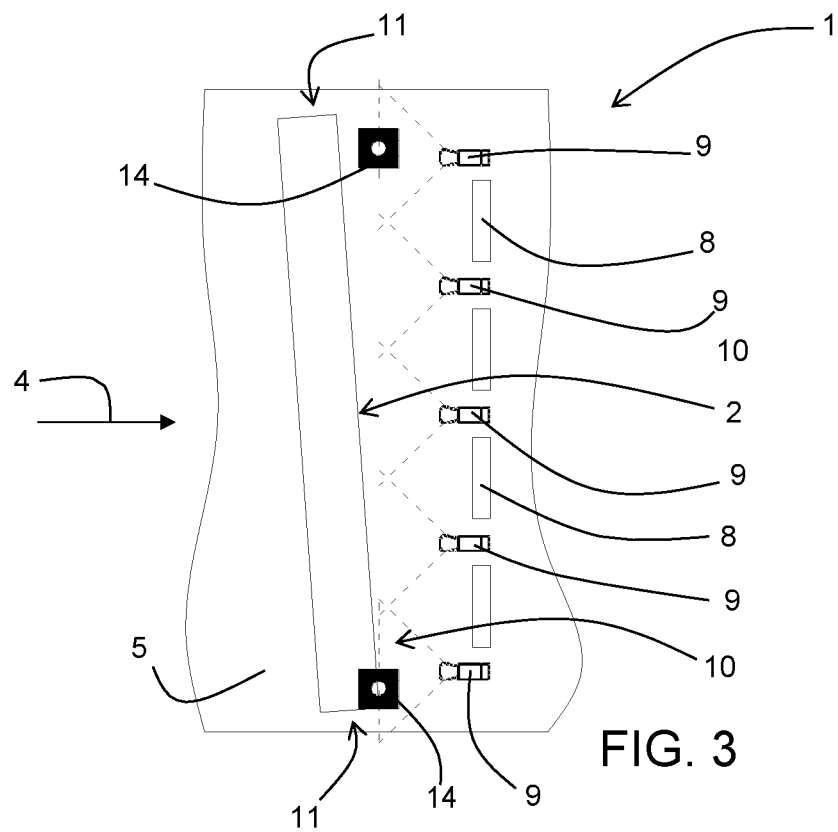
FIG. 3 shows a second embodiment of the apparatus in accordance with the present invention, in a first operating position.

According to a first embodiment, both the position and the one or more inclinations can be determined using an electronic device that comprises two or more detectors 14 (such as photocells or another kind of optical sensors) configured in such a way as to detect the lateral face 2 that crosses them. For example, as shown in FIGS. 3 and 4, two detectors 14 can be positioned in a staggered way relative to the feeding direction 4 so as to identify the moment that the lateral face 2 crosses them. Once the movement of the conveyor 5 is known (for example, using an encoder mounted on its drive axis), the angle of inclination 13 of the entire lateral face 2 can be determined. FIG. 16, on the other hand, shows the situation with a plurality of detectors 14. In other embodiments, a detector 14 can also be positioned at a plane 17 perpendicular to the feeding plane 12, which passes through the optical axis of each area scan camera 9, and the electronic device may comprise observation cameras 15 or other elements (such as a linear detector 18 capable of also determining the profile of the lateral face 2—FIG. 15) instead of or in addition to the detectors 14.

Once the position of each portion 10, and of any one or more inclinations, is known, the method advantageously provides for the capturing step to be performed by taking into account the position of each portion 10 and of its one or more known inclinations, if any.

In particular, there are two preferred modes of taking into account the position and the inclination, if any: either by performing the capturing step at different moments for each first image or parts thereof (first mode) or by retrospectively applying a specific colour balance to each first image captured (second mode). However, in more complete implementations, the two modes can also be combined with each other.

The first mode can advantageously be applied when two portions 10, or two parts of the same portion 10, are in positions staggered along the feeding direction 4 by a value greater than the maximum longitudinal offset. The choice of maximum longitudinal offset can be made from time to time based on the demands of the project. By way of example, it can be set at 0 mm, in which case the first mode is applied basically whenever the lateral face 2 is not perpendicular to the feeding direction 4.

According to the first mode, when the offset position along the feeding direction 4 is greater than the maximum longitudinal offset, the capturing step is performed by capturing each first digital image at different moments in time. The moments of time in which each first digital image is captured are calculated based on the information obtained in the identification step. In particular, they are preferably calculated in such a way that when capturing the relative first digital image, a reference point on the surface of the relative portion (10) of the lateral face (2) is in a pre-determined position. Advantageously, the reference point is a point located on the optical axis of the respective area scan camera 9. The same point is advantageously used as a reference point for identifying the position of each portion 10 along the feeding direction. Preferably, the pre-determined position also corresponds to a certain distance from the camera.

An example of this first mode is shown in FIGS. 5 to 9 and 17 to 21, in each of which a single area scan camera 9 captures the relative first digital image at each moment in time.

Moreover, it should be noted that, in the embodiments shown in these figures, the determination of position and inclination is made upstream, along the feeding direction 4, to the area where the board is located during the capturing step, so as to be able to determine the position and inclination at a sufficient time to be able to perform the capturing step with all the area scan cameras 9.

Moreover, in the case of the embodiment shown in FIGS. 5 to 9, the electronic device for determining position and inclination comprises a pair of observation cameras 15 arranged on the two sides of the conveyor 5; in other embodiments, however, there may be fewer or more than two observation cameras 15, and they may be positioned in other positions, such as above the conveyor 5.

As regards the second mode of taking into account position and inclination, after each first image has been captured, it undergoes a colour-balance correction step, advantageously performed either by the area scan camera 9 itself or directly by the electronic processing unit, before proceeding to the merging step or at the same time thereto. The colour-balance correction step aims to correct any differences in readings, for each individual pixel, due to differences in the surface illumination of the lateral face 2.

To proceed to the colour balance of each first digital image, a calibration step is advantageously performed before implementing the method.

Figure 10:
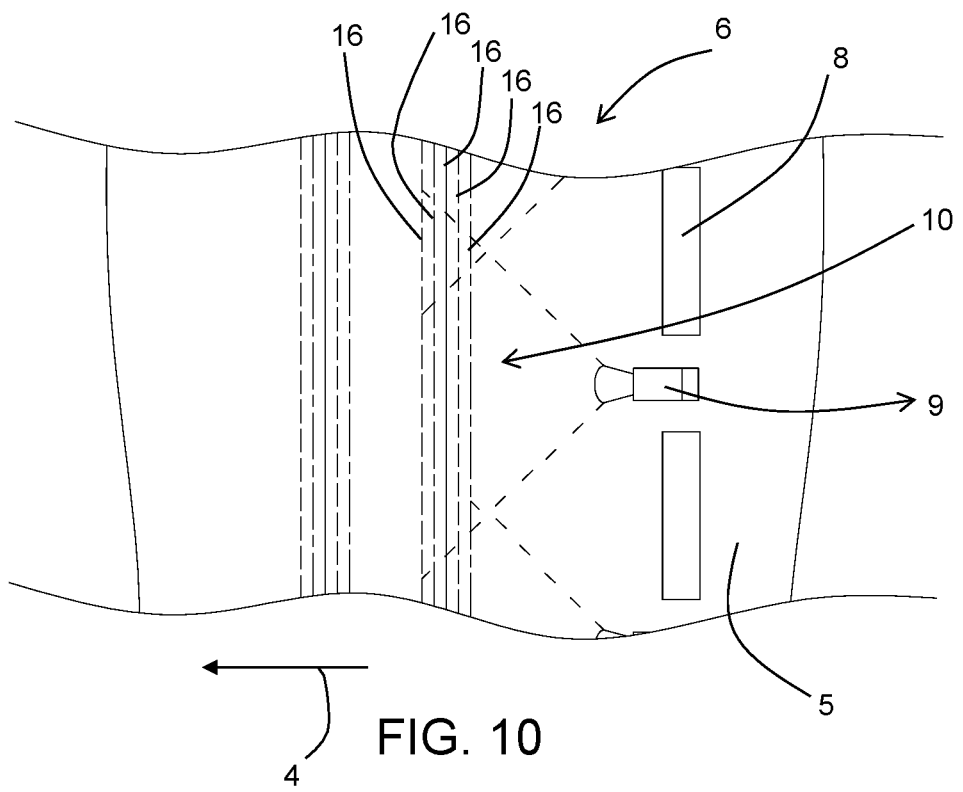
FIG. 10 illustrates a colour-balance calibration step in accordance with the present invention.
Figure 11:
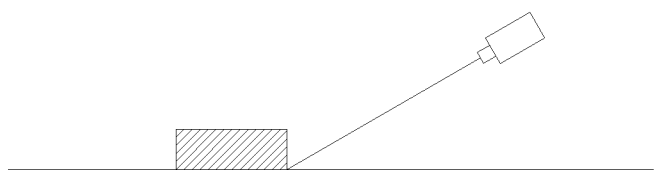
FIGS. 11 to 14 show an operating sequence of an apparatus according to the prior-art technique.
Figure 12:
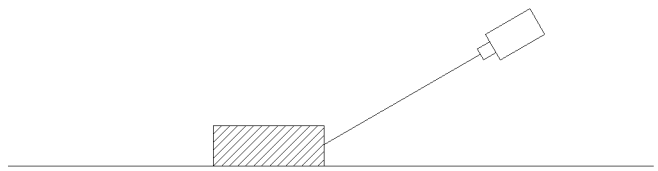
Figure 13:
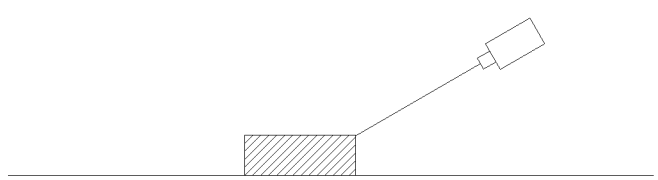
Figure 14:
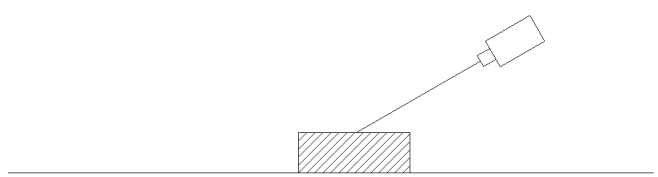

During this calibration step, a plurality of first reference digital images are captured, in which surfaces with known characteristics are visible. In particular, for at least one flat face with a known colour intensity, such face is arranged in a plurality of different reference positions within the observation zone 6. Each reference position is translated, along the feeding direction 4, by a pre-determined distance relative to the others. FIG. 10 schematically illustrates a reference board 16 positioned in five different positions relative to an area scan camera 9 (the various boards are shown with three different types of line).

At each reference position, a first reference image is captured. At that point, by comparing the image captured against the actual colouring of the flat face used (in other words, the intensity in one or more colour channels), a rule of balance can be established, for each reference position and for each point of the image, that balances the colours captured in such a way as to return all readings back to a common reference value.

Once the rules of balance are known for each point of each first digital image in the different pre-determined positions, the first digital images captured can then also be balanced at the points located in intermediate positions (for example, due to the inclination of the lateral face 2) by way of simple interpolations.

Advantageously, however, the colour balance step consists of a white-balance step.

Turning now to the apparatus 1 according to the present invention, this comprises a transverse conveyor 5. The conveyor 5 is configured to convey the wooden board 3 (or, rather, each wooden board 3) along the feeding direction 4 and through an observation zone 6, while the wooden board 3 is arranged on a feeding plane 12 and its lateral faces 2 are arranged transverse to the feeding direction 4 and perpendicularly to the feeding plane 12.

Moreover, the apparatus 1 comprises a plurality of area scan cameras 9 that are associated with the observation zone 6. The area scan cameras 9 are collectively configured to frame one portion 10 of the lateral face 2 when the wooden board 3 is in the observation zone 6, in such a way that the set of all portions 10 framed by the area scan cameras 9 corresponds to the entire extension of the lateral face 2.

The apparatus 1 further comprises one or more light sources 8 also associated with the observation zone 6 to illuminate the entire lateral face 2 when the wooden board 3 is inside the observation zone 6. The one or more light sources 8 are further advantageously configured in such a way as to illuminate the entire lateral face 2 as uniformly as possible.

Both the area scan cameras 9 and the light sources 8 are also arranged outside the feeding path which the wooden boards follow before, after and inside the observation zone 6. Advantageously, this is achieved by positioning them either above or below the feeding path, sufficiently inclined so as to observe the lateral face 2 while it in the observation zone 6 (FIG. 1).

One electronic processing and control unit is connected at least to the plurality of area scan cameras 9, both to receive data in digital format from each area scan camera 9 corresponding to images they have captured, and so as to command each area scan camera 9 to capture one first digital image where the respective portion 10 of the lateral face 2 is visible.

The electronic processing and control unit is further programmed to merge all first digital images captured by the area scan cameras 9 so as to obtain a second digital image representing the entire lateral face 2.

At least in applications in which the lateral surfaces can be inclined relative to the plane 17 perpendicular to the feeding direction 4, the apparatus 1 advantageously comprises a device for identifying the position of the wooden board 3, which is configured to identify the position when the wooden board 3 is located in the observation zone 6.

The device for identifying the position of the wooden board 3 is operationally associated with the electronic processing and control unit to relay information to it concerning the position of the wooden board 3 along the feeding direction 4.

In some embodiments, the device for identifying the position is operationally associated with the electronic processing and control unit, also to further relay information to it concerning one or more inclinations of the portion 10 relative to the plane 17 perpendicular to the feeding direction 4 (as always, assessed about an axis perpendicular to the feeding plane 12).

Depending on the embodiments, the device for identifying the position of the wooden board 3 may comprise different elements, such as one or more photocells and/or one or more optical sensors and/or one or more observation cameras 15, arranged either at or upstream from the observation zone 6.

Advantageously, according to the above description of the method, when the device for identifying the position of the wooden board 3 relays to the electronic processing and control unit that two portions 10 are in two positions which are staggered relative to each other along the feeding direction 4 by a value greater than a maximum longitudinal offset, the electronic processing and control unit is programmed to take this into account when capturing the first images, by adopting appropriate means of intervention.

According to the first mode described above, the electronic processing and control unit is programmed to command each area scan camera 9 to capture the relative first digital image, or parts thereof, at different moments in time, with each moment calculated based on the information received from the device for identifying the position of the wooden board 3, in such a way that when capturing the relative first digital image, or each part thereof, each area scan camera 9 is at a pre-determined distance (preferably the same for each) from a reference point of the relative portion 10 of the lateral face 2.

According to the second mode described above, in other embodiments the electronic processing and control unit is instead programmed to correct each first digital image by applying a colour balance (preferably white) based on its own calibration during which, for at least one face with a known colour intensity, a plurality of first reference digital images has been previously acquired, in particular according to the modes of the method described above. In the embodiments shown in the accompanying figures, the plurality of area scan cameras 9 and one or more light sources 8 are arranged in such a way as to be active on a forward-facing lateral face 2 of the wooden board 3 relative to the feeding direction 4. In other embodiments shown, on the other hand, they can be arranged in such a way as to be active on the backward-facing lateral face 2 of the wooden board 3 relative to the feeding direction 4.

Moreover, advantageously, the area scan cameras 9 and the light sources 8 can be arranged in such a way as to be active both on a lateral face 2 and on one of the front faces (for example, the top face in FIG. 1). In this case, the area scan cameras 9 can be used to capture third digital images showing axial portions 10 of the front face 7, and the electronic processing and control unit can be programmed to command this capturing and to subsequently merge the third digital images to obtain a fourth digital image showing the entire front face 7. Preferably, the fourth digital image is also processed as if it were an image captured by observing each point of the surface of the front face 7 perpendicularly (thus correcting the perspective effects) and, therefore, its proportions correspond to those of the front face 7 itself.

It should also be noted that, in many cases, the image capturing of the bottom front face 7 will have to be performed at least partially using different modes since, to prevent the board from falling, it is not possible to anticipate a moment in which the entire front face 7 is completely free; at least some of its areas must always be covered by elements on which the face is resting. In some applications, however, this problem can be solved by using a conveyor made in accordance with patent EP 3220143, in the name of this same applicant, to which reference should be made for all technical details.

In more complete embodiments, then, the apparatus 1 is designed to capture an image of each of two lateral faces 2 located on opposite sides of the wooden board 3: both the forward-facing one (hereinafter the first lateral face 2) and the backward-facing one (hereinafter the second lateral face 2) relative to the feeding direction 4.

For this purpose, the apparatus 1 comprises two different pluralities of area scan cameras 9 associated with the observation zone 6: a first plurality of area scan cameras 9 configured to frame the first lateral face 2 and a second plurality of area scan cameras 9 configured to frame the second lateral face 2. Moreover, advantageously, at least one of the pluralities of cameras can be arranged in such a way as to also frame one of the front faces.

Furthermore, the apparatus 1 twice comprises one or more light sources 8 (advantageously two pluralities): one or more light sources 8 configured to illuminate the entire first lateral face 2, and one or more light sources 8 configured to illuminate the entire second lateral face 2.

The electronic processing and control unit is connected to both pluralities of area scan cameras 9 and is programmed to merge all first digital images captured by the area scan cameras 9 of each plurality—attributable, therefore, to a same lateral face 2—so as to obtain, for each lateral face 2, a second digital image showing the entire lateral face 2.

The operation of the apparatus 1 heretofore described substantially corresponds to the performance of the steps of the method described in the present invention.

Finally, it should be noted that, although both the method and the apparatus 1 have been described with reference to a single wooden board 3, the preferred implementations of the present invention provide for the boards to be fed along the feeding direction 4 continuously, simply by providing a certain gap between successive boards, and for all steps to be performed for each board that will enter the observation zone 6.

The present invention offers significant advantages.

The present invention has indeed made it possible to overcome the limitations of the construction solutions currently being used, and a method and an apparatus have been developed that enable images to be captured of the lateral faces of boards moving transversely along a path, which are of a clearly superior quality relative to that possible today in timber processing plants.

Finally, it is worth noting that the present invention is relatively easy to make and that the cost associated with its implementation is also not very high.

Many modifications and variations can be made to the invention as designed herein without departing from the scope of the present invention.

All details can be replaced by other technically equivalent details and any materials, shapes and dimensions of the various components may be used according to requirements.

The invention claimed is:

1. Method for capturing an image of a lateral face of a wooden board, where the lateral face (2) is parallel to a main axis of development of the wooden board (3), with the method comprising:
- a feeding step wherein, using a conveyor (5), the wooden board (3) is fed along a feeding direction (4) with the lateral face (2) arranged transverse to the feeding direction (4) and with a front face (7) lying on a feeding plane (12), until reaching an observation zone (6);
- an illumination step wherein, in the observation zone (6), the lateral face (2) is illuminated with one or more light sources (8) located outside of a feeding path of the wooden board (3), defined by the conveyor (5);
- a capturing step wherein, while the lateral face (2) is illuminated by the one or more light sources (8), and using a plurality of area scan cameras (9) also located outside the feeding path, a plurality of first digital images are captured, wherein each first digital image is captured by a different area scan camera (9) and comprises a different portion (10) of the lateral face (2) that extends for an entire height of the lateral face (2), transverse to the main axis of development, and for part of a length of the lateral face (2), along the main axis of development, where the set of all such portions (10) corresponds to the entire lateral face (2), wherein each area scan camera (9) images a different portion (10) of the lateral face (2) and the lateral face (2) is overall imaged by said plurality of area scan cameras (2); and
- a merging step wherein, using an electronic processing unit, the first digital images are merged to obtain a second digital image showing the entire lateral face (2);

wherein:
- before the capturing step an identification step is executed wherein, using an electronic device, the position of each of said portions (10) of the lateral face (2) along the feeding direction (4) is determined;
- the capturing step is performed by taking into account the position of the portion (10) determined in the identification step; and
- when in the identification step it is determined that two portions (10) are in positions staggered along the feeding direction (4) by a value greater than a maximum longitudinal offset, the capturing step is performed by capturing the relative first digital images of each of the two portions (10) at different moments in time which are calculated based on the information determined in the identification step, in such a way that when capturing the relative first digital image, a reference point of the relative portion (10) of the lateral face (2) is in a pre-determined position.

2. Method according to claim 1 wherein, in the identification step, using the electronic device and for each portion (10) of the lateral face (2), one or more inclinations are determined relative to a plane (17) perpendicular to the feeding direction (4), assessed as a rotation about an axis perpendicular to the feeding plane (12), and wherein the capturing step is performed by also taking into account the one or more inclinations.

3. Method according to claim 2 wherein, in the identification step, the inclination of each portion (10) is determined by assessing one or more of its angles of inclination (13).

4. Method according to claim 1, further comprising a correction step wherein, using the electronic processing unit, each first digital image is corrected by applying colour balance.

5. Method according to claim 4, wherein the correction step is performed based on the results of a preceding calibration step wherein a plurality of first reference digital images have been captured for at least one face which has a known colour intensity, and which has been arranged in a plurality of reference positions, one after another, inside the observation zone (6).

6. Method according to claim 2, further comprising a correction step wherein, using the electronic processing unit, each first digital image is corrected by applying colour balance, and wherein the correction step is performed by taking into account the results of the identification step.

7. Method according to claim 1, wherein the method is operated for a lateral face (2) of the wooden board (3) which is forward-facing relative to the feeding direction (4), or for a lateral face (2) of the wooden board (3) which is backward-facing relative to the feeding direction (4) and/or for both such lateral faces (2).

8. Method according to claim 1, wherein the illumination step is carried out by illuminating the lateral face (2) with uniform lighting or structured lighting.

9. Apparatus for capturing an image of at least one lateral face of a wooden board, where the lateral face (2) is parallel to a main axis of development of the wooden board (3), comprising:
- a transverse conveyor (5) configured to convey, along a feeding direction (4) and through an observation zone (6), the wooden board (3), arranged with a front face (7) on a feeding plane (12) and with the lateral face (2) arranged transverse to the feeding direction (4);
- a plurality of area scan cameras (9), associated with the observation zone (6), and configured so as to each image one different portion (10) of the lateral face (2) when the wooden board (3) is in the observation zone (6), with each portion (10) of the lateral face (2) extending for an entire height of the lateral face (2) transverse to the main axis of development, and for part of a length of the lateral face (2) along the main axis of development, with the set of all portions (10) imaged by the area scan cameras (9) corresponding to the entire extension of the lateral face (2), said plurality of area scan cameras (2) imaging overall the lateral face (2) and each different area scan camera (9) capturing a respective first digital image which comprises a different portion (10) of the lateral face (2);
- one or more light sources (8) associated with the observation zone (6) to illuminate the entire lateral face (2) when the wooden board (3) is inside the observation zone (6);
- one electronic processing and control unit connected to the plurality of area scan cameras (9) so as to receive data in digital format from each camera corresponding to images they have captured, and so as to command each area scan camera (9) to capture one first digital image in which the respective portion (10) of the lateral face (2) is visible;

wherein the electronic processing and control unit is programmed to merge all first digital images captured by the area scan cameras (9) so as to obtain a second digital image showing the entire lateral face (2)

wherein the apparatus further comprises a device for determining the position of each portion (10) when the portion (10) is in the observation zone (6), operationally associated with the electronic processing and control unit to relay information to the electronic processing and control unit concerning the position of each portion (10) along the feeding direction (4);

and wherein, when the device for determining the position relays to the electronic processing and control unit that two portions (10) are in positions staggered along the feeding direction (4) by a value greater than a maximum longitudinal offset, the electronic processing and control unit is programmed to command each area scan camera (9) to capture the relative first digital image of each of the two portions (10) at different moments in time which are calculated based on the information received from the device for determining the position of each portion (10) in such a way that, when capturing the relative first digital image, each area scan camera (9) is at a pre-determined distance from a reference point of the relative portion (10) of the lateral face (2).

10. Apparatus according to claim 9 wherein the device for determining the position is operationally associated with the electronic processing and control unit to further relay information to the electronic processing and control unit concerning one or more inclinations of the portion (10) relative to a plane (17) perpendicular to the feeding direction (4) about an axis perpendicular to the feeding plane (12).

11. Apparatus according to claim 9 wherein the device for determining the position of the wooden board (3) comprises one or more photocells and/or one or more optical sensors and/or one or more observation cameras (15), arranged at or upstream from the observation zone (6).

12. Apparatus according to claim 9 wherein the electronic processing and control unit is programmed to correct each first digital image by applying colour balance.

13. Apparatus according to claim 12, wherein the processing and control unit is calibrated to apply colour balancing, by means of capturing a plurality of first reference digital images for at least one face with a known colour intensity, arranged at a plurality of different distances from each digital camera inside the observation zone (6).

14. Apparatus according to claim 9, wherein the plurality of area scan cameras (9) and the one or more light sources (8) are arranged in such a way as to be active on one lateral face (2) of the wooden board (3) which is forward-facing relative to the feeding direction (4), or on one lateral face (2) of the wooden board (3) which is backward-facing relative to the feeding direction (4).

15. Apparatus according to claim 9 for capturing an image of two lateral faces (2) located on opposite parts of the wooden board (3), where a first lateral face (2) of the wooden board (3) is facing forward relative to the feeding direction (4), and a second lateral face (2) of the wooden board (3) is facing backward relative to the feeding direction (4), wherein the apparatus (1) comprises two of said pluralities of area scan cameras, associated with the observation zone (6), with a first plurality of area scan cameras being configured to image the first lateral face (2) and a second plurality of area scan cameras being configured to image the second lateral face (2), wherein the apparatus (1) further comprises one or more light sources (8) configured to illuminate the entire first lateral face (2), and one or more light sources (8) configured to illuminate the second lateral face (2), and wherein the electronic processing and control unit is connected to both pluralities of area scan cameras and is programmed to merge all first digital images captured by the area scan cameras (9) of each plurality, attributable to one of the two lateral faces (2), to obtain, for each lateral face (2), a second digital image which shows the entire lateral face (2).

* * * * *